March 26, 1963     O. W. HOLDEN     3,082,988
SUCTION CUP MOUNTING FOR KITCHEN APPLIANCE
Filed Aug. 5, 1959     2 Sheets-Sheet 1
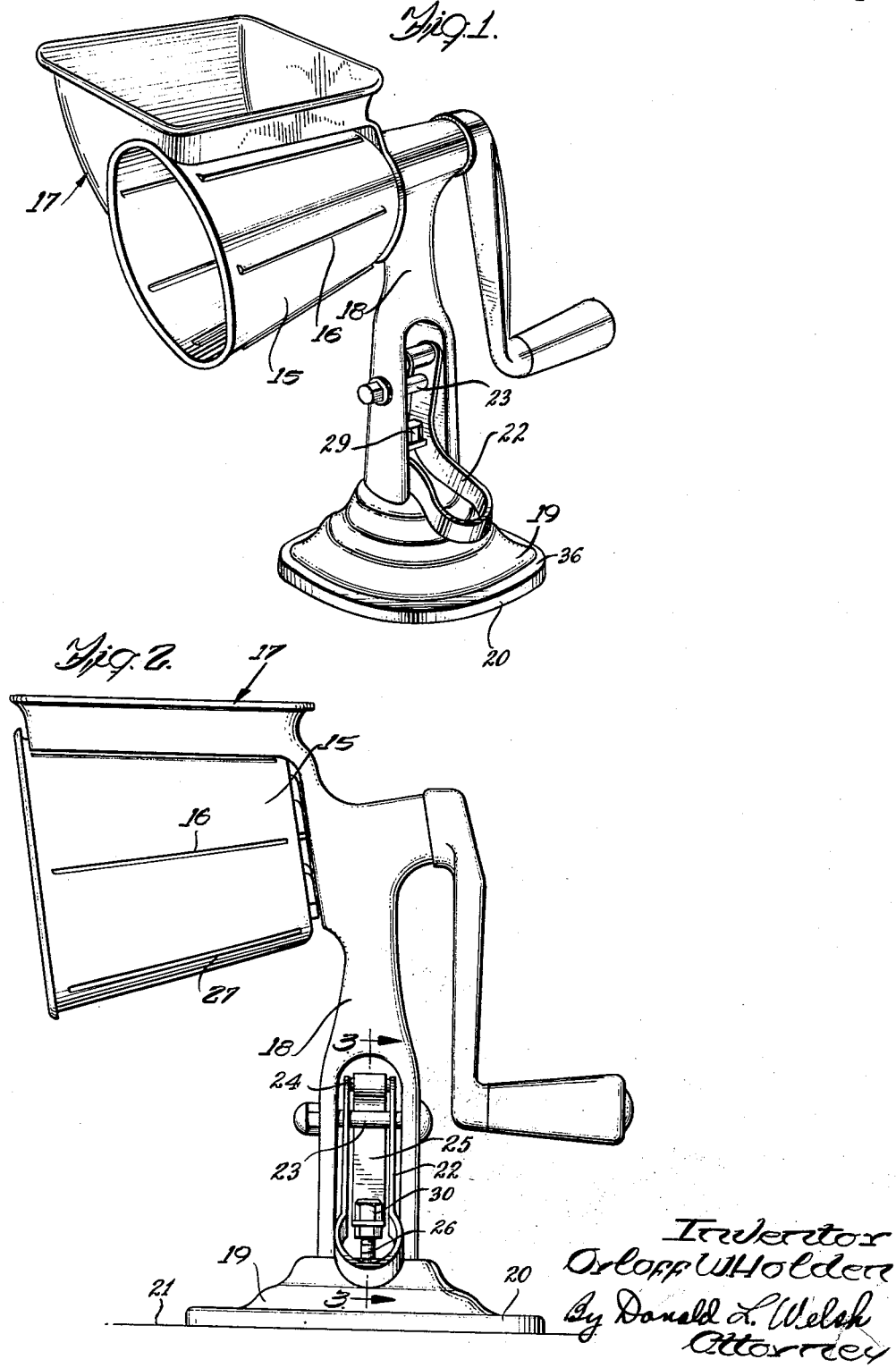

March 26, 1963　　　　O. W. HOLDEN　　　　3,082,988
SUCTION CUP MOUNTING FOR KITCHEN APPLIANCE
Filed Aug. 5, 1959　　　　　　　　　　2 Sheets-Sheet 2
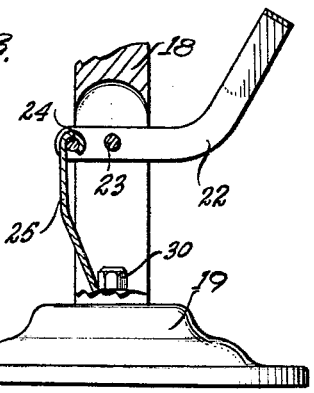
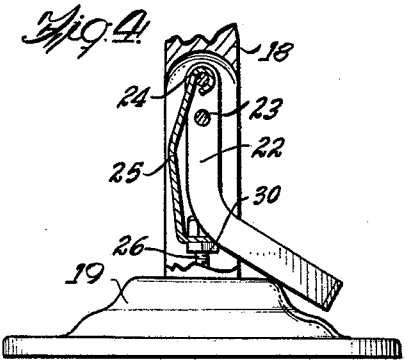
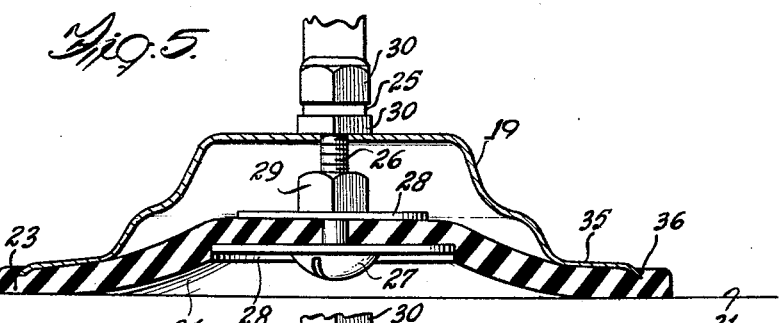
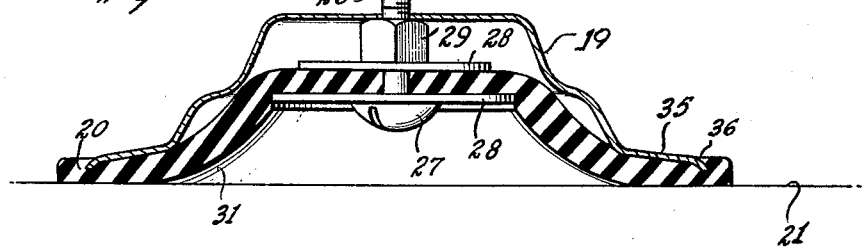
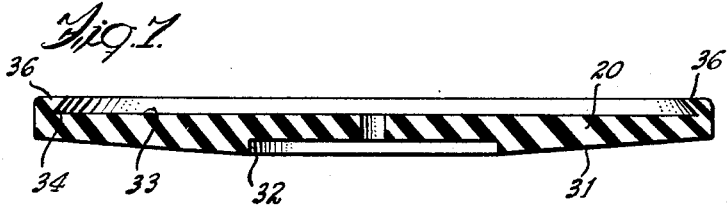
Inventor
Orloff W. Holden
By Donald L. Welsh
Attorney

3,082,988
SUCTION CUP MOUNTING FOR KITCHEN APPLIANCE
Orloff W. Holden, Chicago, Ill., assignor to Steam-O-Matic Corporation, Sedalia, Mo.
Filed Aug. 5, 1959, Ser. No. 831,781
2 Claims. (Cl. 248—206)

This invention relates generally to kitchen appliances having an activated suction cup mounting. The mounting is of the type having a resilient disk whose center portion is raised and lowered to produce and release a vacuum beneath the disk when its periphery is engaging a smooth supporting surface.

One object of the invention is to provide an activated suction cup mounting including a resilient disk which is constructed in a novel manner to insure a complete release of the vacuum beneath the disk merely as an incident to lowering of its center portion and without the necessity of raising any edge portion of the disk from the supporting surface.

A more detailed object is to shape the disk and support its periphery in a novel manner to insure that the only vacuum created beneath the disk is due to raising its central portion after the periphery of the disk engages the supporting surface.

Other objects and advantages of the invention will become apparent from the following detailed description taken in connection with the accompanying drawings in which:

FIGURE 1 is a perspective view of a typical appliance having a mounting embodying the novel features of the present invention;

FIG. 2 is a side elevational view;

FIGS. 3 and 4 are fragmentary side elevational views with some parts broken away along the line 3—3 of FIG. 2 and shown in section, the disk activating members being in different positions in the two figures;

FIGS. 5 and 6 are fragmentary diametrical sectional views of the base and resilient disk showing the parts in different positions corresponding respectively to the positions of the operating lever in FIGS. 3 and 4;

FIG. 7 is a diametrical sectional view of the resilient disk in its relaxed condition.

The kitchen appliance shown in the drawings to illustrate the present invention is especially adapted for cutting or shredding food and comprises generally a hollow cutting member 15 with teeth 16 moving horizontally beneath a hopper 17. The hopper opens upwardly to receive the food and contains the same during the cutting operations. Both the cutter and the hopper are mounted on a post 18 upstanding from a base 19 which is adapted to be secured to a horizontal supporting surface.

The mounting for the cutter 15 and hopper 17 in addition to the post 18 and the base 19, includes a disk 20 of resilient material connected to the base and adapted to engage a smooth supporting surface 21 (FIGS. 2, 5 and 6) and be shifted relative thereto to create a vacuum for retaining the cup against the surface. Such connection and shifting is effected by a toggle activating mechanism comprising a lever 22 fulcrumed on a horizontal pin 23 on the post and pivotally connected at 24 to one end to a link 25 whose other end is connected to the upper end of a plunger 26, the other end portion of the lever constituting an operating handle. The plunger reciprocates vertically through the center of the base 19 which is annular and is concave on its underside to receive the central portion of the resilient disk 20. The plunger is formed as a bolt and, at its lower headed end 27, extends through the central portion of the disk and carries two annular plates 28 which are clamped against opposite sides of the disk and between the head 27 and a nut 29 threaded on the plunger. Two other nuts 30 on the upper end of the plunger clamp against opposite sides of the lower inwardly bent end of the link.

The toggle lever 22 is movable between a generally horizontal inactive position (FIG. 3) and an overcenter position (FIG. 4). In the inactive position, the pivot 24 between the lever and the link 25 is on one side of a vertical through the lever fulcrum 23 and the plunger 26 and the center portion of the resilient disk 20 are in lower positions (FIG. 5). In the overcenter position of the lever, the pivot is just on the other side of the vertical and the plunger and central portion of the disk are raised (FIG. 6), the peripheral portion of the disk engaging the underside of the periphery of the base. A downward force exerted on the plunger due to the resilience of the disk is transmitted through the link and tends to keep the lever in the overcenter position. Movement of the plunger and toggle mechanisms in opposite directions is limited by engagement of opposite sides of the base with the nut 29 on the lower end of the plunger and the adjacent one of the upper nuts 30. With the periphery of the disk engaging a smooth supporting surface, the raising of the central portion of the disk creates a vacuum holding the disk against the surface. Lowering of the plunger and central portion then tends to relieve such vacuum.

In another of its aspects, the present invention contemplates a novel construction of the resilient disk 20 and the base 19 to insure that the vacuum is released upon lowering of the plunger and thereby avoid the necessity of peripheral tabs or other devices for raising a portion of the periphery of the disk. To this end, the disk is characterized by a convex axially facing surface 31 in its relaxed condition as shown in FIG. 7 and is secured to the plunger with this surface facing downwardly. Also, the base engages and interlocks with the disk at the peripheral portions of the two for augmenting the release of the suction by causing the disk to move upwardly with one edge of the base as the base is tilted. To enable the central portion of the disk to move closer to the supporting surface 21 without contact between the latter and the bolt head, this portion is recessed as indicated at 32 to receive the lower plate 28 on the plunger 26 and enable that plate to be set inwardly above the lower convex disk surface.

The disk 20 in this instance is molded from a suitable material such as neoprene rubber. The convex surface 31 is of conical configuration. To interlock with the base, the other axial face of the disk is formed with a recess 33 having an undercut periphery as indicated at 34 to receive the peripheral edge of the base. This edge is turned downwardly from an adjacent generally flat section 35 which engages the disk over a substantial area. Inwardly from this section, the base is recessed on its underside to avoid interference with the central portion of the disk and the plunger. The interlocking of the peripheries of the base and disk is effected by making the diameter of the disk equal approximately to the largest diameter of the upper disk recess and less than the inner diameter of an inwardly projecting lip 36 around the recess, such lip and the edge of the base being spaced inwardly from the edge of the disk.

With the disk 20 secured to the plunger 26 and the parts assembled with the edge of the base 19 locked behind the lip 36 on the disk and the plunger in the lower position, there is hardly any tendency for a vacuum to be created upon engagement of the disk with the supporting surface. This is believed to be due to the fact that the peripheral portion of the disk is backed and stiffened by the flat edge section 35 of the base so as to reduce its tendencies to flex upon contacting the supporting surface 21. Another contributing factor is believed to be the convex initial, unstressed curvature of the downwardly facing disk surface 31. Due to the lack of vacuum upon initial contact of the disk with the supporting surface, adherence of the two takes place only when the lever 22 is actuated to raise the plunger as shown in FIG. 6. As in the case of its inactivated condition, the peripheral portion of the disk then engages the supporting surface over a substantial area. During the upward motion of the center portion, the underside of that portion between the periphery and the lower plate 28 tends to become stretched.

When the operating lever 22 is raised from the over-center position and the plunger 26 and center portion of the disk 20 move downwardly, the vacuum is relieved so that the post 18 with the cutter 15 and hopper 17 thereon may be lifted easily from the supporting surface 21. Such relief is so complete that there is virtually no tendency of the disk to stick to the supporting surface during the lifting. The completeness of the relief is believed to be due primarily to the convex curvature of the outer disk surface 31 in the relaxed condition of the disk and to a resulting outward movement of the parts of this surface toward the periphery of the disk as the plunger is shifted downwardly into its lower position.

I claim as my invention:

1. In a kitchen appliance, the combination of an upright post secured at its lower end to an annular base having a concave downwardly facing surface, a circular disk of resilient material characterized, in the relaxed condition of the disk by an annular convex surface on one of its axially facing sides proceeding inwardly from the peripheral edge of said side toward the axis of the disk with said peripheral edge defining the outer border of said surface, said disk being aligned axially with said base and fitting under said concave surface of the base with the periphery of the base engaging the upper side of the disk near the periphery of the disk and with said convex annular surface of the disk facing downwardly away from the base, and activating mechanism for said disk including a member mounted on said base for reciprocation along the axis of the base and said disk and connected to the center portion of the disk for movement of such portion between a lower position adjacent the plane of the periphery of said downwardly facing convex disk surface and an upper higher position in which a suction is created beneath the disk.

2. In a kitchen appliance, the combination of an upright post secured at its lower end to an annular base having a concave downwardly facing surface, a circular disk of resilient material characterized by a convex annular surface on a first one of its axially facing side in the relaxed condition of the disk, said convex surface proceeding from the peripheral edge of said one side inwardly toward the axis of the disk with said peripheral edge defining the outer border of said surface, said disk being alined axially with said base and fitting under said concave surface of the base with said first side of the disk facing downwardly away from the base, and activating mechanism for said disk including a member mounted on said base for reciprocation along the axis of the base and said disk and connected to the center portion of the disk for movement of such portion between a lower position adjacent the plane of the periphery of said downwardly facing first side of the disk and an upper higher position in which a suction is created beneath the disk, a lip extending around and inwardly from the periphery of said disk on the other side thereof and cooperating with the disk to define a recess opening radially and inwardly to receive the periphery of said base, said base periphery extending radially and outwardly into said recess and underlying said lip to engage the lip and apply an upward force thereon when the base is moved upwardly away from a horizontal supporting surface.

References Cited in the file of this patent

UNITED STATES PATENTS

| 1,313,307 | Locraft | Aug. 19, 1919 |
| 1,840,400 | Lebherz | Jan. 12, 1932 |
| 1,945,239 | Thomas | Jan. 30, 1934 |
| 2,634,076 | Van Dusen | Apr. 7, 1953 |
| 2,807,300 | Gilbert | Sept. 24, 1957 |
| 2,908,467 | Aberer | Oct. 13, 1959 |
| 2,940,713 | Van Dusen | June 14, 1960 |

FOREIGN PATENTS

| 873,442 | Germany | Apr. 13, 1953 |